US008429564B2

(12) United States Patent
Alexanderovitc et al.

(10) Patent No.: US 8,429,564 B2
(45) Date of Patent: Apr. 23, 2013

(54) CONTROLLING METHOD OF THREE-DIMENSIONAL USER INTERFACE SWITCHOVER AND MOBILE TERMINAL USING THE SAME

(75) Inventors: Rassenikov Alexander Alexanderovitc, Seoul (KR); Jaedo Kwak, Seoul (KR)

(73) Assignee: LG Electronics Inc., Seoul (KR)

( * ) Notice: Subject to any disclaimer, the term of this patent is extended or adjusted under 35 U.S.C. 154(b) by 417 days.

(21) Appl. No.: 12/360,812

(22) Filed: Jan. 27, 2009

(65) Prior Publication Data

US 2010/0064259 A1   Mar. 11, 2010

(30) Foreign Application Priority Data

Sep. 11, 2008  (KR) ........................ 10-2008-0089617

(51) Int. Cl.
*G06F 3/048*  (2006.01)

(52) U.S. Cl.
USPC ........... 715/852; 715/850; 715/782; 715/757; 715/836

(58) Field of Classification Search .................. 715/762, 715/764, 852; 345/173
See application file for complete search history.

(56) References Cited

U.S. PATENT DOCUMENTS

| | | | | |
|---|---|---|---|---|
| 5,926,179 A | * | 7/1999 | Matsuda et al. | 715/752 |
| 6,043,818 A | * | 3/2000 | Nakano et al. | 715/851 |
| 6,081,271 A | * | 6/2000 | Bardon et al. | 345/419 |
| 6,130,672 A |   | 10/2000 | Yamazaki et al. | |
| 6,147,678 A | * | 11/2000 | Kumar et al. | 345/158 |
| 6,160,899 A | * | 12/2000 | Lee et al. | 382/103 |
| 7,564,507 B2 | * | 7/2009 | Park | 349/15 |
| 2003/0048280 A1 | * | 3/2003 | Russell | 345/619 |
| 2003/0095154 A1 | * | 5/2003 | Colmenarez | 345/863 |
| 2003/0142136 A1 |   | 7/2003 | Carter et al. | |
| 2005/0156882 A1 | * | 7/2005 | Manchester | 345/158 |
| 2005/0216867 A1 | * | 9/2005 | Marvit et al. | 715/863 |
| 2005/0253807 A1 | * | 11/2005 | Hohmann et al. | 345/156 |

(Continued)

FOREIGN PATENT DOCUMENTS

| | | |
|---|---|---|
| WO | 00/73888 | 12/2000 |
| WO | 02/093331 | 11/2002 |
| WO | 2006/022770 | 3/2006 |
| WO | 2007/042857 | 4/2007 |
| WO | 2007-042857 | 4/2007 |

OTHER PUBLICATIONS

Brooke Hallowell & Charissa R. Lansing, Tracking Eye Movement to Study Cognition and Communication, Nov. 16, 2004, http://www.asha.org/Publications/leader/2004/041116/f041116a.htm.*

(Continued)

*Primary Examiner* — Tuyetlien Tran
*Assistant Examiner* — Abimbola Ayeni
(74) *Attorney, Agent, or Firm* — Lee, Hong, Degerman, Kang & Waimey

(57) ABSTRACT

The exemplary embodiment relates to a method of controlling a three-dimensional user interface, which controls a three-dimensional user interface to follow a user's motion, and a mobile terminal using the same. The method comprising: displaying a plurality of three-dimensional menu icons; sensing movement of a user; and rotating at least one of the plurality of three-dimensional menu icons according to the sensed movement such that at least one reference face of the at least one of the plurality of three-dimensional menu icons follows the user's movement.

14 Claims, 11 Drawing Sheets

U.S. PATENT DOCUMENTS

2006/0020898 A1* 1/2006 Kim et al. .................... 715/764
2006/0164382 A1* 7/2006 Kulas et al. .................. 345/156
2008/0089587 A1* 4/2008 Kim et al. .................... 382/190
2008/0266289 A1* 10/2008 Park ............................. 345/419
2009/0256809 A1* 10/2009 Minor .......................... 345/173
2009/0313584 A1* 12/2009 Kerr et al. .................... 715/849

OTHER PUBLICATIONS

Robert J. K. Jacob, The Use of Eye Movements in Human-Computer Interaction Techniques: What You Look at is What You Get, Apr. 1991, ACM Transactions on Information Systems.*

* cited by examiner

CONTROLLING METHOD OF THREE-DIMENSIONAL USER INTERFACE SWITCHOVER AND MOBILE TERMINAL USING THE SAME

CROSS-REFERENCE TO RELATED APPLICATIONS

This application claims the benefit of Korea Patent Application No. 10-2008-0089617 filed on Sep. 11, 2008, which is incorporated herein by reference for all purposes as if fully set forth herein.

FIELD OF THE INVENTION

The exemplary embodiment relates to a method of controlling a three-dimensional user interface, which controls a three-dimensional user interface to follow a user's motion, and a mobile terminal using the same.

DISCUSSION OF THE RELATED ART

As the functionality of terminals, such as personal computers, notebooks, and mobile phones, is diversified, the information devices have been implemented in the form of multimedia players equipped with complex functions, such as capturing images and video, playing music or video files, game, and reception of broadcast.

Terminals can be divided into mobile terminals and stationary terminals according to whether they are movable. Mobile terminals can be divided into handheld terminals and vehicle mount terminals according to whether they can be directly carried on by a user.

In order to support and increase the functionality of a terminal, to improve structural and/or software portions of the terminal may be taken into consideration.

In recent years, as a variety of terminals including mobile terminals provide complex and various functions, there is a tendency that a user interface (UI), including a menu display, a list display, etc., becomes more complicated. Three-dimensional user interface technology, which can implement a complicated menu structure simply and colorfully using three-dimensional graphic images, has recently been applied to mobile terminals. However, the three-dimensional user interface could not be implemented realistically since a relative position change of a user and a mobile terminal was not taken into consideration.

SUMMARY OF THE INVENTION

The exemplary embodiment provides a method of controlling a three-dimensional user interface, which can increase the degree of actual feeling of a three-dimensional user interface by moving a user interface toward a user when a relative position of the user and a mobile terminal is changed, and a mobile terminal using the same.

In accordance with an aspect of the exemplary embodiment, there is provided a method of controlling a three-dimensional user interface of a mobile terminal comprising: displaying a plurality of three-dimensional menu icons; sensing movement of a user; and rotating at least one of the plurality of three-dimensional menu icons according to the sensed movement such that at least one reference face of the at least one of the plurality of three-dimensional menu icons follows the user's movement.

In accordance with an aspect of the exemplary embodiment, there is provided a mobile terminal comprising a display displaying a plurality of three-dimensional menu icons; a motion sensor sensing movement of a user; and a controller rotating at least one of the plurality of three-dimensional menu icons according to the sensed movement such that at least one reference face of the at least one of the plurality of three-dimensional menu icons follows the user's movement.

BRIEF DESCRIPTION OF THE DRAWINGS

The above and other aspects, features, and advantages of the exemplary embodiment will become more apparent upon consideration of the following description of preferred embodiments, taken in conjunction with the accompanying drawing figures.

DETAILED DESCRIPTION OF PREFERRED EMBODIMENTS

Merits and characteristics of the invention, and methods for accomplishing them will become more evident from the following description taken in conjunction with the accompanying drawings. The exemplary embodiment will now be described in detail in connection with specific embodiments with reference to the accompanying drawings. Wherever possible, the same reference numbers will be used throughout the drawings to refer to the same or similar parts. Further, in describing the exemplary embodiment, detailed description on the known functions and constructions will be omitted if they are deemed to make the gist of the exemplary embodiment unnecessarily vague.

A mobile terminal related to the exemplary embodiment will now be described in detail with reference to the accompanying drawings. It is to be noted that the suffixes of constituent elements used in the following description, such as "module" and "unit", are simply used by considering the easiness of writing this specification, but are not particularly given importance and roles. Accordingly, the terminologies "module" and "unit" can be mixed in use.

A mobile terminal described in this specification may include mobile phones, smart phones, notebooks computers, terminals for digital broadcast, personal digital assistants (PDA), portable multimedia players (PMP), navigators, to a name few.

Figure 1:
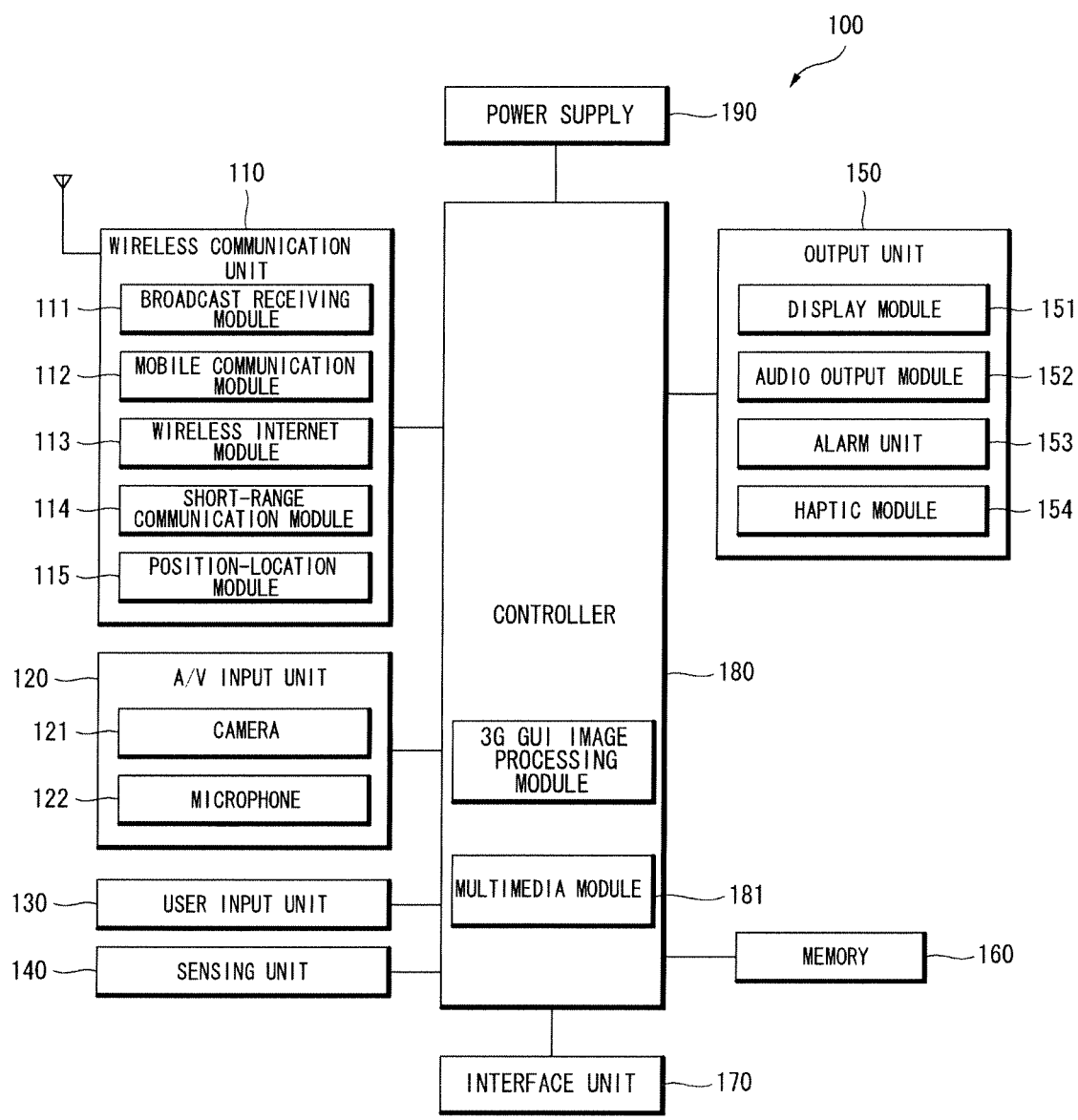
FIG. 1 is a block diagram of a mobile terminal related to an embodiment of the exemplary embodiment.

FIG. 1 is a block diagram of a mobile terminal related to an embodiment of the exemplary embodiment.

The mobile terminal 100 may include a wireless communication unit 110, an audio/video (A/V) input unit 120, a user input unit 130, a sensing unit 140, an output unit 150, memory 160, an interface unit 170, a controller 180, a power supply 190 and the like. The components shown in FIG. 1 are not indispensable, but it is understood that a mobile terminal having greater or fewer components may alternatively be implemented.

Hereinafter, the components are described sequentially.

The wireless communication unit 110 may include one or more modules, enabling wireless communications between the mobile terminal 100 and a wireless communication system or between the mobile terminal 100 and a network where the mobile terminal 100 is located. For example, the wireless communication unit 110 may include a broadcast receiving module 111, a mobile communication module 112, a wireless Internet module 113, a short-range communication module 114, a position-location module 115, and so on.

The broadcast receiving module 111 receives broadcast signals and/or broadcast associated information from an external broadcast managing entity via a broadcast channel.

The broadcast channel may include a satellite channel and a terrestrial channel. The broadcast managing entity refers generally to a system, which generates and transmits broadcast signals and/or broadcast associated information, or a system, which receives previously generated broadcast signals and/or broadcast associated information and provides them to a terminal. The broadcast signals may be implemented as TV broadcast signals, radio broadcast signals, and data broadcast signals, among others. If desired, the broadcast signals may further include broadcast signals combined with TV or radio broadcast signals.

The broadcast associated information may refer to information associated with a broadcast channel, a broadcast program or a broadcast service provider. The broadcast associated information may also be provided via a mobile communication network. In this case, the broadcast associated information may be received by the mobile communication module 112.

The broadcast associated information may exist in various forms. For instance, the broadcast associated information may include an electronic program guide (EPG) of digital multimedia broadcasting (DMB), electronic service guide (ESG) of digital video broadcast-handheld (DVB-H) or the like.

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), media forward link only (MediaFLO®), digital video broadcast-handheld (DVB-H), and integrated services digital broadcast-terrestrial (ISDB-T). It is also to be understood that the broadcast receiving module 111 may be configured to be suitable for other broadcast systems, which provide broadcast signals, as well as the digital broadcast systems.

The broadcast signal and/or broadcast associated information received via the broadcast receiving module 111 may be stored in the memory 160.

The mobile communication module 112 transmits/receives radio signals to/from a base station, an external terminal, and an entity over a mobile communication network. The radio signals may include various forms of data according to transmission/reception of voice call signals, video telephony call signals and text/multimedia messages.

The wireless Internet module 113 refers to a module for wireless Internet access. This module may be internally or externally coupled to the mobile terminal 100. Wireless Internet technologies may include wireless LAN (WLAN) (Wi-Fi), wireless broadband (Wibro), world interoperability for microwave access (Wimax), high-speed downlink packet access (HSDPA), and so on.

The short-range communication module 114 refers to a module for short-range communications. Suitable short-range communication technologies may include Bluetooth, radio frequency identification (RFID), infrared data association (IrDA), ultra-wideband (UWB), ZigBee, to name a few.

The position-location module 115 is a module for identifying or otherwise obtaining the location of a mobile terminal. A representative one of examples of the position-location module 115 includes a global positioning system (GPS). According to the current technology, the GPS module 115 can calculate three-dimensional position information on the basis of latitude, longitude, and altitude with respect to one point (object) on a specific time by calculating information about the distance of the one point (object) from three or more satellites and information about the time where the distance information was measured and then applying trigonometry to the calculated distance information. A method of calculating position and time information using three satellites and modifying error of the calculated position and time information using another satellite is also used. The GPS module 115 also continues to calculate a current location in real-time and calculates velocity information based on the current location.

The A/V input unit 120 is configured to input audio or video signals. The A/V input unit 120 may include a camera 121, a microphone 122 and the like. The camera 121 receives and processes image frames of still pictures or video obtained by an image sensor in a video call mode or a photographing mode. The processed image frames may be displayed on the display 151.

The image frames processed in the camera 121 may be stored in the memory 160 or transmitted to the outside via the wireless communication unit 110. Two or more cameras 121 may be included according to the configuration aspect of a terminal. The camera 121 may be used as a sensor for sensing a change in the position of a user's head and eyes when a menu comprised of three-dimensional graphic images is displayed on the display of the mobile terminal 100.

The microphone 122 receives external sound signals via the microphone in mode, such as a phone call mode, a recording mode, and a voice recognition mode, and processes the sound signals into electrical voice data. The processed voice data can be converted into a form, which can be transmitted to a mobile communication base station through the mobile communication module 112 in the case of a phone call mode, and then output. Various noise removing algorithms for removing noise occurring in the course of receiving external sound signals may be implemented in the microphone 122.

The user input unit 130 generates input data responsive to user manipulation of an associated terminal or terminals. Examples of the user input unit 130 may include a keypad, a dome switch, a touchpad (e.g., static pressure/capacitance), a jog wheel, a jog switch, etc.

The sensing unit 140 senses a current status of the mobile terminal 100 and generates a sensing signal for controlling an operation of the mobile terminal 100. For instance, the sensing unit 140 may detect an open/close status of the mobile terminal 100, a position of the mobile terminal 100, a presence or absence of user contact with the mobile terminal, orientation of the mobile terminal, acceleration/deceleration of the mobile terminal, and so on. As an example, in the case in which the mobile terminal 100 is configured as a slide-type mobile terminal, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. Meanwhile, the sensing unit 140 may include a proximity sensor. The sensing unit 140 may include an angular sensor for sensing an angle change of the mobile terminal.

The output unit 150 is configured to generate outputs associated with the sense of sight, the sense of hearing, tactile sense, and so on and may include a display 151, an audio output module 152, an alarm unit 153, a haptic module 154 and the like.

The display unit 151 displays information processed in the mobile terminal 100. For example, when the mobile terminal is in a phone call mode, the display unit 151 displays a user interface (UI), a graphic user interface (GUI) or a three-dimensional graphic user interface (3D GUI), which is associated with a phone call. When the mobile terminal 100 is in a video call mode or a photographing mode, the display unit 151 displays photographed and/or received images.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display.

Some of the displays may be configured in a transparent type or a light-transmitting type, enabling the outside to be seen therethrough. This may be called a transparent display. Representative examples of the transparent display may include a transparent LCD, etc. Some of the displays may also be configured in a rear-side structure or light-transmitting type of the display 151. Such configurations enable a user to see objects located in the rear of a terminal body through an area occupied by the display 151 of the terminal body.

Two or more displays 151 may exist according to the configuration type of the mobile terminal 100. For example, a plurality of the displays may be arranged with them being spaced apart from each other or integrally on one surface of the mobile terminal 100 and arranged on different surfaces of the mobile terminal 100. Here, a three-dimensional user interface, which will be described later on, may be displayed on each of the displays.

In the case in which the display 151 and a sensor for sensing a touch operation (hereinafter referred to as a 'touch sensor') constitute a mutual layered structure (hereinafter referred to as a 'touch screen'), the display 151 may also be used as an input device as well as an output device. The touch sensor may have a form such as a touch film, a touch sheet, and a touch pad.

The touch sensor may be configured to convert a change in the pressure applied to a specific portion of the display 151, electrostatic capacitance occurring at a specific portion of the display 151, etc. into an electrical input signal. The touch sensor may be configured to sense pressure at the time of touch as well as a touched position and area.

In the case in which there is a touch input to the touch sensor, a corresponding signal(s) is sent to a touch controller. The touch controller processes the signal(s) and transmits corresponding data to the controller 180. Thus, the controller 180 can determine which area of the display 151 has been touched.

A proximity sensor may be positioned in an internal area of the mobile terminal, which is surrounded by the touch screen, or near the touch screen. The proximity sensor refers to a sensor for sensing objects approaching a specific detection surface or whether objects exist nearby without mechanical contact by employing electromagnetic force or infrared rays. The proximity sensor has a longer lifespan than that of a contact type sensor and also has increased efficiency.

Examples of the proximity sensor may include a transmit type photoelectric sensor, a direct reflection type photoelectric sensor, a mirror reflection type photoelectric sensor, a high frequency oscillation type proximity sensor, an electrostatic capacitance type proximity sensor, a magnetic type proximity sensor, an infrared proximity sensor, and so on.

In the case in which the touch screen is an electrostatic type, the touch screen is configured to sense the proximity of a pointer based on a change in electric field according to the proximity of the pointer. In this case, the touch screen (touch sensor) may be classified as a proximity sensor.

The proximity sensor is configured to sense a proximity touch action and a proximity touch pattern (including, for example, a proximity touch distance, a proximity touch direction, a proximity touch speed, a proximity touch time, a proximity touch position, a proximity touch moving status, etc.). Information corresponding to the sensed proximity touch operation and the proximity touch pattern may be output on a touch screen.

The audio output module 152 may output audio data, which is received from the wireless communication unit 110 or stored in the memory 160, in various modes including call-receiving mode, call-placing mode, recording mode, voice recognition mode and broadcast reception mode. The audio output module 152 outputs audio relating to a particular function (e.g., call received and message received), which is performed in the mobile terminal 100. The audio output module 152 may be implemented using receivers, speakers, buzzers, and so on.

The alarm unit 153 outputs signals to inform the occurrence of events in the mobile terminal 100. For example, the events occurring in the mobile terminal may include signals, including call-received and message-received, a key entry signal, a touch input, and so on. The alarm unit 153 may also output signals to inform the occurrence of events in different ways other than the audio or video signal, for example, through vibration. The video signal or the audio signal may also be output through the display 151 or the audio output module 152.

The haptic module 154 generates a variety of haptic effects which can be felt by a user. One of representative examples of the haptic effects, which are generated by the haptic module 154, includes a vibration effect. The intensity, pattern, etc. of vibration generated by the haptic module 154 can be controlled. For example, different vibrations may be combined or output or sequentially output.

The haptic module 154 may generate various haptic effects, for example, an effect caused by the stimulus of arrangement of pins, which move vertically to a contact skin surface, an effect caused by a stimulus through spraying force or suction force by the air through an injection nozzle or an inlet, an effect caused by a stimulus passing over the skin surface, an effect caused by a stimulus through the contact of an electrode, an effect caused by a stimulus employing electrostatic force, and an effect caused by the reappearance of a feeling of cold and warmth employing an element that may absorb or generate heat, as well as the vibration effect.

The haptic module 154 may be implemented to not only transfer the haptic effects through a direct contact, but also make the haptic effects felt through myestheia of a user's finger, arm, etc. Two or more haptic modules 154 may be included according to a configuration aspect of the mobile terminal 100.

The memory 160 may be configured to store programs for processing an overall control operation of the controller 180, including a control program of a three-dimensional user interface to be described later on, and also temporarily store input/output data (for example, phonebook data, messages, pictures, video, etc.). The memory 160 may store data relating to various patterns of vibrations and sounds, which are output at the time of touch entry on a touch screen.

The memory 160 may include at least one type of storage media, including a flash memory type, a hard disk type, a multimedia card microphone type, card type memory (for example, SD or XD memory, etc.), random access memory (RAM), static random access memory (SRAM), read-only memory (ROM), electrically erasable programmable read-only memory (EEPROM), programmable read-only memory (PROM) magnetic memory, magnetic disk, and optical disk. The mobile terminal 100 may also operate in association with a web storage that performs a storage function of the memory 160 on the Internet.

The interface unit 170 is often implemented to couple the mobile terminal 100 with external devices. The interface unit 170 is configured to receive data or power from the external devices and transfer the data or power to each component within the mobile terminal 100 or transmit data within the mobile terminal 100 to the external devices. For example, a wired/wireless headset port, an external charger port, a wired/wireless data port, a memory card port, an identity module card port, an audio input/output (I/O) port, a video I/O port, an earphone port, and so on may be included in the interface unit 170.

The identity module is a chip that stores various pieces of information for authenticating use authority of the mobile terminal 100 and may include a user identify module (UIM), a subscriber identify module (SIM), a universal subscriber identity module (USIM) and the like. An apparatus equipped with an identity module (hereinafter referred to as an 'identity device') may be fabricated in a smart card form. Accordingly, the identity device may be connected to the mobile terminal 100 via the identity module port of the interface unit 170. The identity module stores telephone numbers, phone call information, billing information, etc.

The interface unit 170 may become a passage through which power source from an external cradle is supplied to the mobile terminal 100 when the mobile terminal 100 is coupled to the cradle or a passage through which a variety of command signals input from the cradle are transferred to the mobile terminal 100 by a user. The variety of command signals or power source input from the cradle may operate as signals to recognize that the mobile terminal has been mounted in the cradle accurately.

The controller 180 controls the overall operations of the mobile terminal 100. For instance, the controller performs the control and processing associated with voice calls, data communications, and video calls. The controller 180 may include a multimedia module 181 for multimedia playback. The multimedia module 181 may be implemented within the controller 180 or separately from the controller 180.

The controller 180 may perform a pattern recognition processing in which writing entry or drawing entry performed on a touch screen can be recognized as text and images.

The controller 180 includes a 3D GUI image processing module. The 3D GUI image processing module generates a 3D GUI menu image for implementing a three-dimensional user interface and rotates the 3D GUI menu image such that a reference surface(s) of the 3D GUI menu image follows a user's motion sensed by a camera or other sensor means. The 3D GUI image processing module may enlarge the size of a corresponding icon when a user selects a specific menu icon in the 3D GUI menu image.

The power supply 190 provides internal power source and/or external power source required by various components under the control of the controller 180.

The various embodiments described herein may be implemented in a recording medium readable by a computer or its similar devices by employing, for example, software, hardware or some combinations thereof.

For a hardware implementation, the embodiments described herein may be implemented within at least one of application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein or a selective combination thereof. In some cases, the embodiments may be implemented by the controller 180.

For a software implementation, the embodiments such as procedures and functions may be implemented with separate software modules, each of which performs one or more of the functions and operations described herein. Software codes may be implemented using a software application written in any suitable programming language. The software codes may be stored in the memory 160 and executed by the controller 180.

Figure 2A:
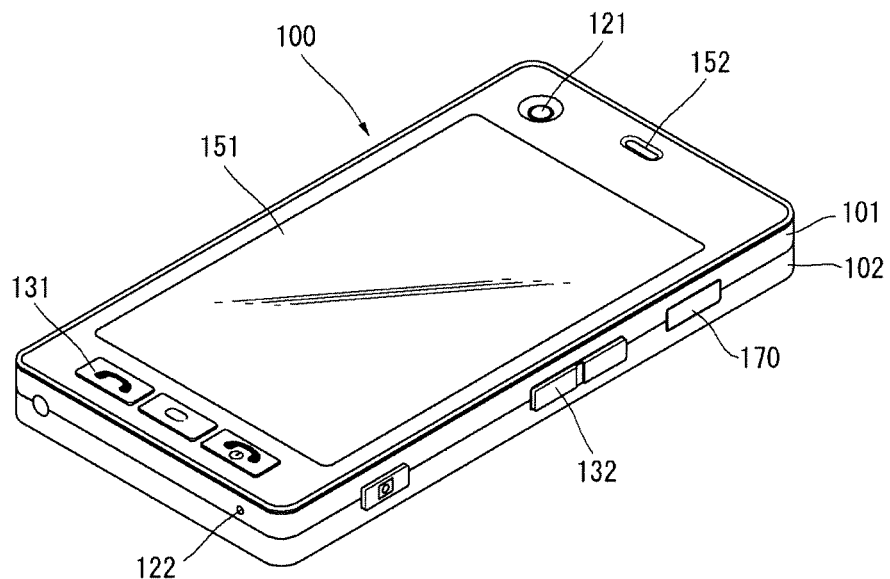
FIG. 2A is a perspective view of a front side of a handheld terminal related to an embodiment of the exemplary embodiment.

FIG. 2A is a perspective view of a front side of the mobile terminal according to an embodiment of the exemplary embodiment.

The mobile terminal 100 is equipped with a bar-type terminal body. The exemplary embodiment is not limited to the above example, but may be applied to a variety of configurations in which two or more bodies are coupled in such a way as to move relative to each other, such as slide-type, folder-type, swing-type and swivel-type, and combinations thereof.

A body includes a case (a casing, a housing, a cover, and so on) constituting an external appearance of the mobile terminal. In the present embodiment, the case may be divided into a front case 101 and a rear case 102. A variety of electronic components are built in space formed between the front case 101 and the rear case 102. At least one intermediate case may be further disposed between the front case 101 and the rear case 102.

The cases may be fabricated by injecting synthetic resin or may be fabricated to have metal materials such as stainless steel (STS) or titanium (Ti).

The display 151, the audio output unit 152, the camera 121, a plurality of manipulation units 131 and 132, the microphone 122, the interface unit 170, and so on may be disposed in the terminal body, mainly, the front case 101.

The display 151 occupies the greater part of a main surface of the front case 101. The audio output unit 152 and the camera 121 are disposed in an area adjacent to one of both ends of the display 151, and the first manipulation unit 131 and the microphone 122 are disposed in an area adjacent to the other of both ends of the display 151. The second manipulation unit 132, the interface unit 170, etc. are disposed on the sides of the front case 101 and the rear case 102.

The user input unit 130 is manipulated in such a way as to receive commands for controlling the operations of the mobile terminal 100 and may include the plurality of manipulation units 131 and 132. The manipulation units 131 and 132 may be collectively called a manipulating portion and may adopt any kind of a method as long as it is a tactile manner, which allows a user to manipulate the manipulation units 131 and 132 while feeling a tactile sense.

Contents input by the manipulation units 131 and 132 may be set in various ways. For example, the first manipulation unit 131 may be configured to receive commands, such as start, stop, and scroll, and the second manipulation unit 132 may be configured to receive commands, such as a volume control of audio output from the audio output unit 152 or switching of the display 151 to a touch recognition mode.

Figure 2B:
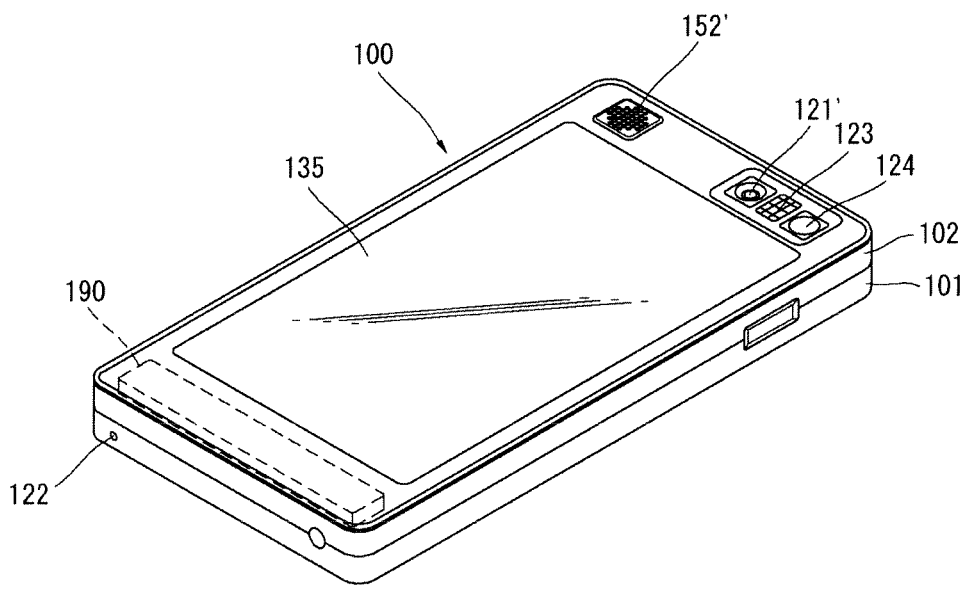
FIG. 2B is a perspective view of a rear side of a handheld terminal related to an embodiment of the exemplary embodiment.

FIG. 2B is a perspective view of a rear side of the mobile terminal 100.

Referring to FIG. 2B, a camera 121' may be further mounted to a rear side of the terminal body, i.e., the rear case 102. The camera 121' may be a camera, which faces a direction that is substantially opposite to a direction faced by the camera 121 (refer to FIG. 2A) and has pixels different from that of the camera 121.

For example, the camera 121 may operate with a relatively lower resolution sufficiently enough to capture an image of a user's face and transmit the captured image to a counterpart in video calls or the like. The camera 121' may operate with a relatively higher resolution, which is useful for obtaining higher quality pictures for later use or for communicating to others. The cameras 121 and 121' may be installed in the terminal body such that they can be rotated or popped up.

A flash 123 and a mirror 124 may be further disposed adjacent to the camera 121'. The flash 123 irradiates light to a subject when the subject is photographed by the camera 121'. The mirror 124 is useful for assisting a user to position the camera 121 in a self-portrait mode.

An audio output unit 152' may be further disposed on the rear side of the terminal body. The audio output unit 152' may implement a stereo function together with the audio output unit 152 (refer to FIG. 2a) of the front side and may be used to implement a speakerphone mode at the time of calls.

A broadcast signal receiving antenna other than an antenna for calls, etc. may be further disposed on the side of the terminal body. The antenna, constituting a part of the broadcast receiving module 111 of FIG. 1, may be configured to retract into the terminal body.

The power supply 190 for supplying power to the mobile terminal 100 may be mounted in the terminal body. The power supply 190 may be configured internally or externally to the terminal body so that it is directly detachable therefrom.

A touch pad 135 for sensing touch may be further mounted in the rear case 102. The touch pad 135 may also be configured in a light-transmitting type like the display 151. In this case, in the case in which the display 151 is configured to output sight information from its both sides, the sight information can also be recognized even through the touch pad 135. Information output to the both sides of the display 151 may be controlled by the touch pad 135. Unlike the above, a display may be further mounted in the touch pad 135 and, therefore, a touch screen may be disposed in the rear case 102.

The touch pad 135 may operate in association with the display 151 of the front case 101. The touch pad 135 may be disposed in parallel to the display 151 in the rear of the display 151. The touch pad 135 may have a size which is identical to or smaller than that of the display 151.

Hereinafter, the method of controlling a three-dimensional user interface according to embodiments of the exemplary embodiment is described in detail with reference to FIGS. 3 to 9. In the method of controlling a three-dimensional user interface according to the following embodiments, a camera and an angle sensor will be illustrated as sensor means for sensing user motions of the mobile terminal 100 and a user's eye motion. However, it is to be understood that user motions and a user's eye motion may also be detected using a variety of known sensor means, such as a proximity sensor or an optical sensor, as well as a camera.

Figure 3:
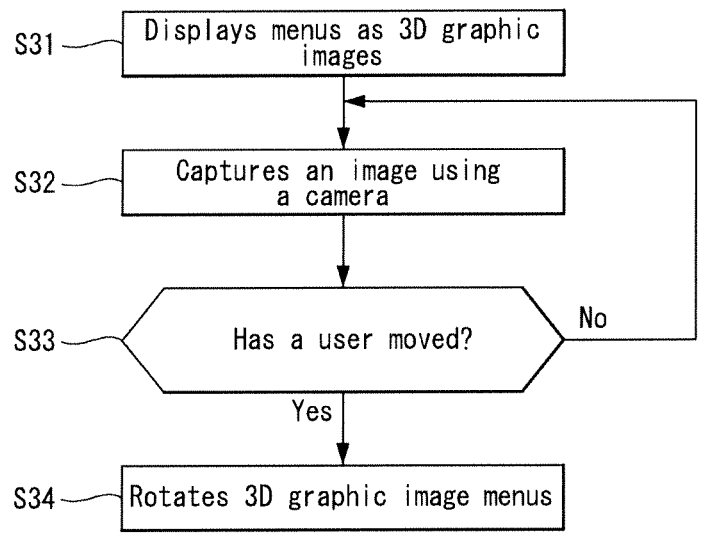
FIG. 3 is a flowchart showing a method of controlling a three-dimensional user interface according to a first embodiment of the exemplary embodiment.

FIG. 3 is a flowchart showing a method of controlling a three-dimensional user interface according to a first embodiment of the exemplary embodiment. FIGS. 5A to 5D are diagrams showing a method of controlling a three-dimensional user interface according to embodiments of the exemplary embodiment.

Referring to FIGS. 3 and 5A to 5D, a plurality of three-dimensional menu icons is displayed on the display 151 of the mobile terminal 100 as three-dimensional graphic images (S31). Each of the three-dimensional menu icons is generated as a polyhedral image and includes an up-level menu display face (MM) and down-level menu display faces (SM). The three-dimensional menu icons may include environment setting, a phonebook menu including a telephone directory, message service, broadcast reception, a multimedia contents playback menu, and so on.

The camera 121 of the mobile terminal 100 photographs a user in front under the control of the controller 180 while the three-dimensional graphic images are displayed on the display 151 (S32).

The controller 180 monitors motions of the user who employs the mobile terminal 100 in real-time based on video signals, which are acquired by the camera 121, when the three-dimensional graphic images are displayed on the display 151 (S33). In general, a distance between the mobile terminal 100 and the user is 25 cm to 35 cm. Considering the distance, the controller 180 calculates the user's moving speed and direction by comparing frames of the image captured by the camera 121. The controller 180 may also calculate a user's moving speed and direction based on an output signal of sensor means other than the camera 121. Alternatively, the controller 180 may calculate a user's moving speed and direction by comparing the user's images captured by two or more cameras 121.

If it is determined that the user has moved, the controller 180 controls the 3D GUI image processing module to rotate the reference face of the respective three-dimensional menu icons along the moving direction of the user (S34). The rotation speeds of the menu icons are adjusted according to the user's moving speed. The reference face is one lateral face of the three-dimensional menu icon, which is now displayed on the display 151 of the mobile terminal 100 before the user moves, and may be an up-level display face (MM) or a down-level display face (SM). As a result, the reference face of the three-dimensional menu icons follows the user's motion and are rotated, as shown in FIGS. 5A to 5D. It is to be understood that the rotation directions of the polyhedral three-dimensional menu icons are not limited to FIGS. 5A to 5D, but may be rotated in any direction along the moving direction of a user by the 3D GUI image processing module.

The user can feel realistic through the three-dimensional graphic movements of the polyhedral three-dimensional menu icons because the reference face of the menus is moved along the direction in which the user moves. The user can also easily understand a menu arrangement state, which is now being activated, since the reference face of the three-dimensional menu icons, which is seen before the user moves, are always oriented toward him.

Figure 4:
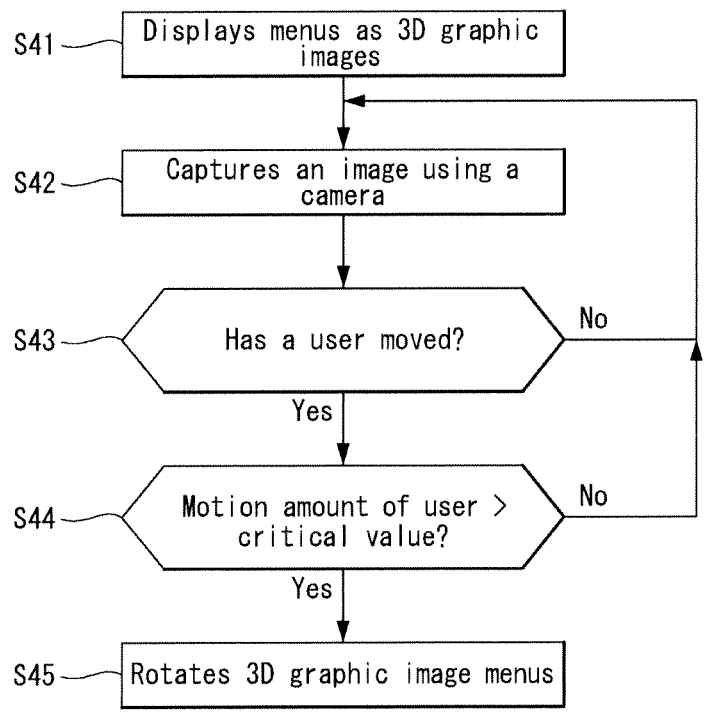
FIG. 4 is a flowchart showing a method of controlling a three-dimensional user interface according to a second embodiment of the exemplary embodiment.
Figure 5A:
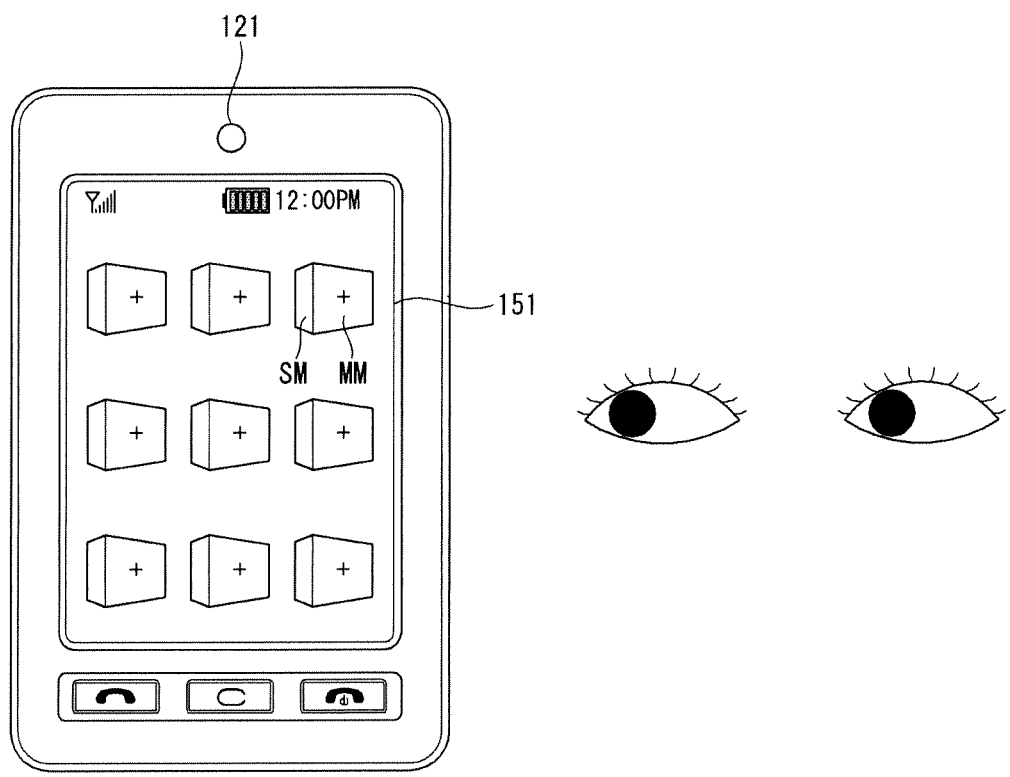
FIGS. 5A to 5D are diagrams showing a method of controlling a three-dimensional user interface according to embodiments of the exemplary embodiment.
Figure 5B:
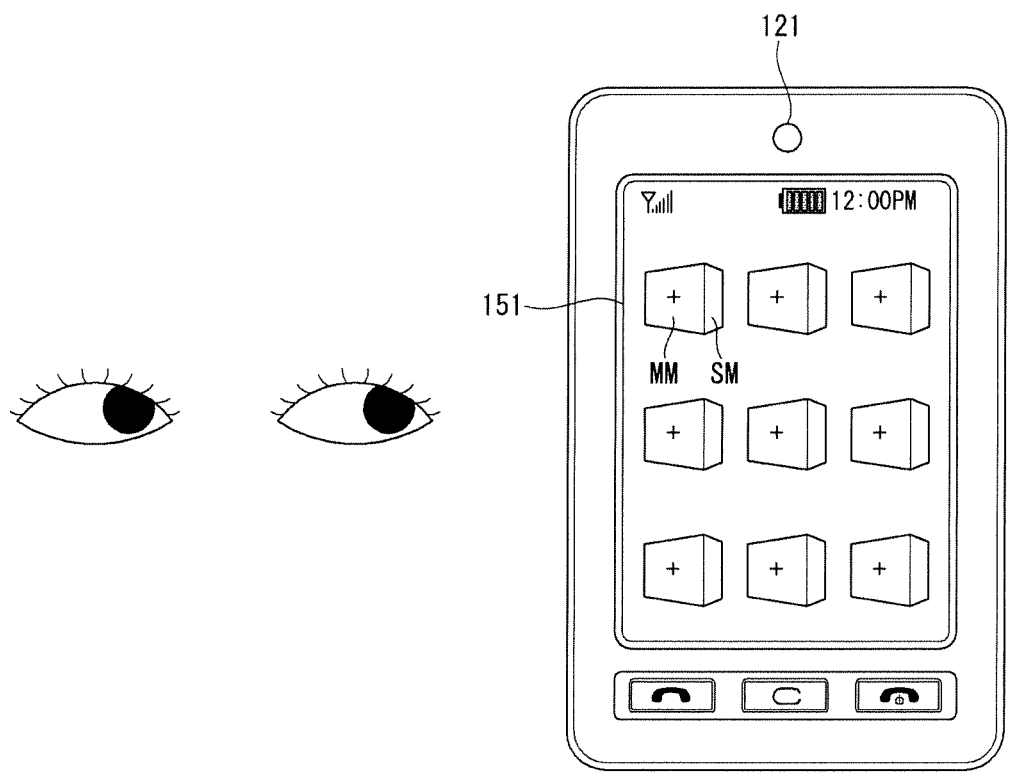
Figure 5C:
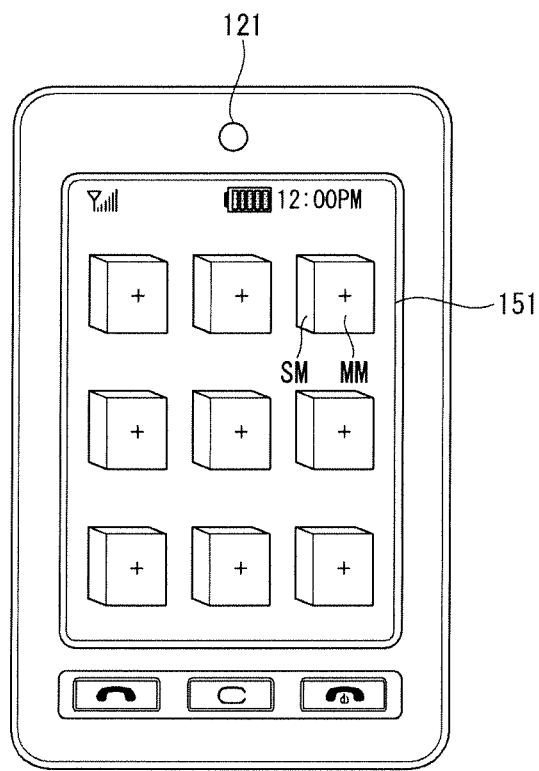
Figure 5D:
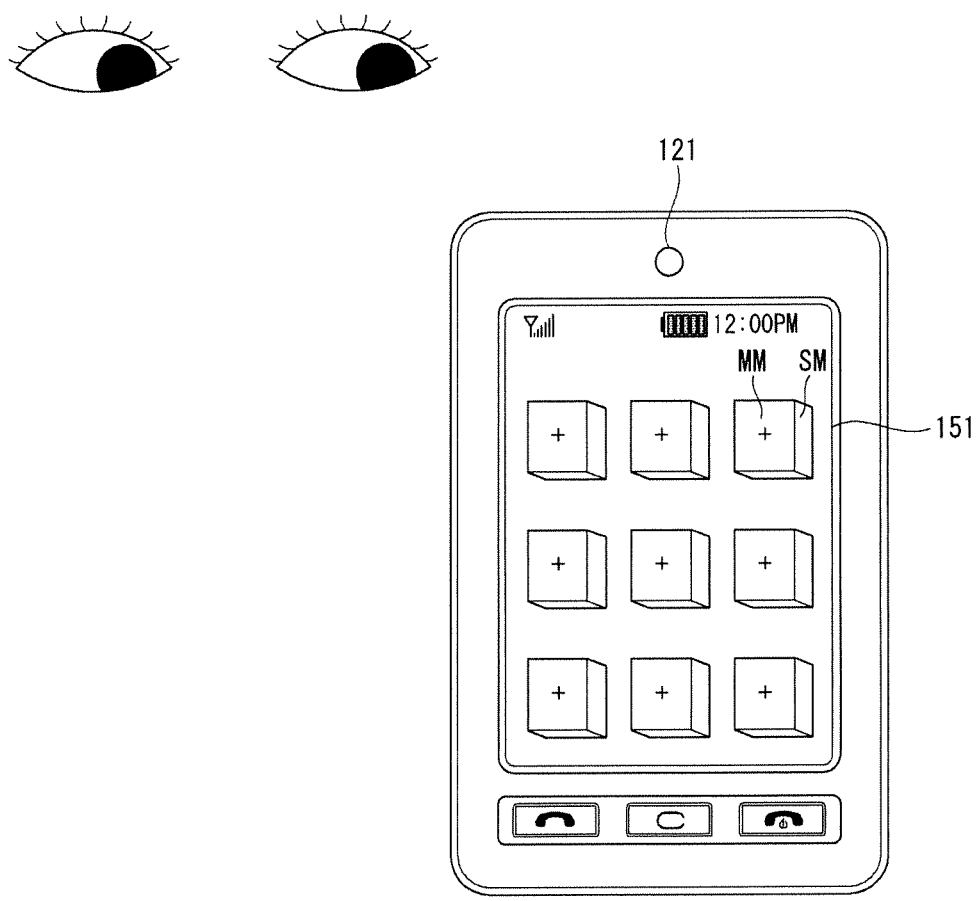

FIG. 4 is a flowchart showing a method of controlling a three-dimensional user interface according to a second embodiment of the exemplary embodiment.

Referring to FIG. 4, a plurality of three-dimensional menu icons is displayed on the display 151 of the mobile terminal 100 as three-dimensional graphic images (S41).

The camera 121 of the mobile terminal 100 photographs a user in front under the control of the controller 180 while the three-dimensional graphic images are displayed on the display 151 (S42).

The controller 180 monitors motions of the user who employs the mobile terminal 100 in real-time based on video signals, which are acquired by the camera 121, when the three-dimensional graphic images are displayed on the display 151 (S43). When a motion amount of the user is over a specific threshold value(or critical value), the controller 180 controls the 3D GUI image processing module to rotate the reference face of the respective three-dimensional menu icons every specific angle along the moving direction of the user (S44 and S45). The rotation speeds of the menu icons are adjusted according to the user's moving speed. As described above, the reference face is one lateral face of the three-dimensional menu icon, which is now displayed on the display 151 of the mobile terminal 100 before the user moves. The threshold value can be decided experimentally in order to prevent unwanted operations, such as shaking of a menu screen when a relative position of the mobile terminal 100 and a user is moved a little. The threshold value may be set to an angle of about 15° to 20° on the basis of a specific front center of the mobile terminal 100. The three-dimensional menu icons are rotated such that the reference face thereof follows the user's motion and may be rotated every angle of about 15° to 20°, as shown in FIGS. 5A to 5D.

Figure 6:
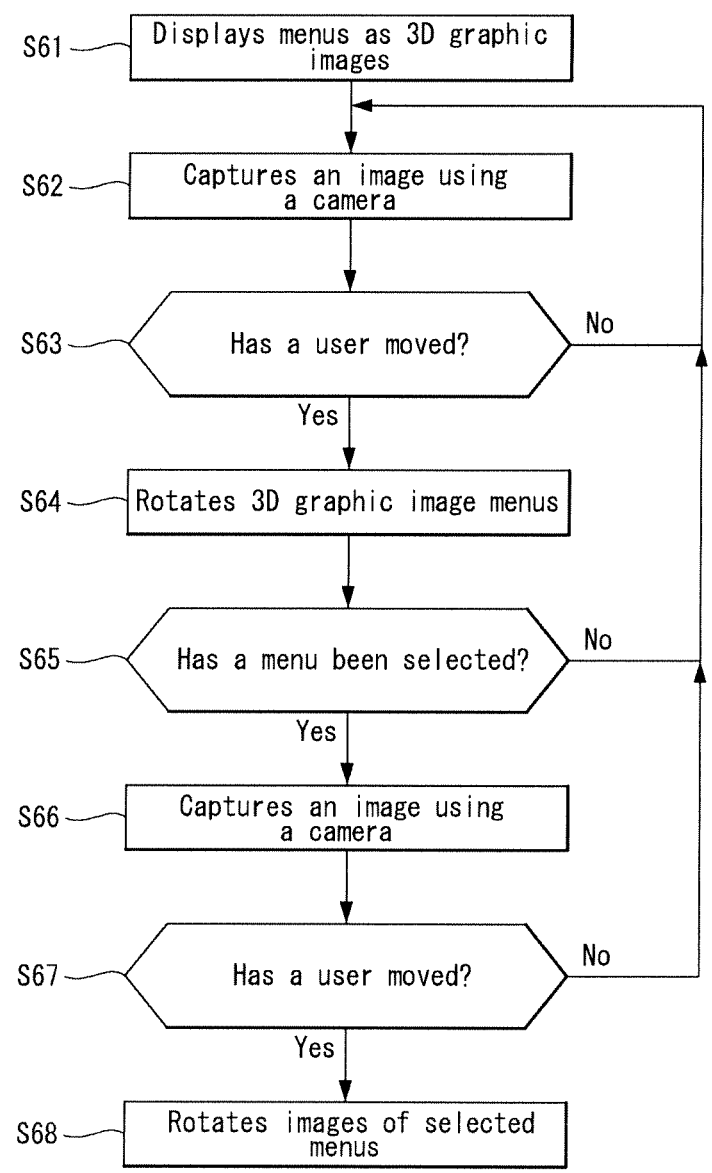
FIG. 6 is a flowchart showing a method of controlling a three-dimensional user interface according to a third embodiment of the exemplary embodiment.
Figure 7:
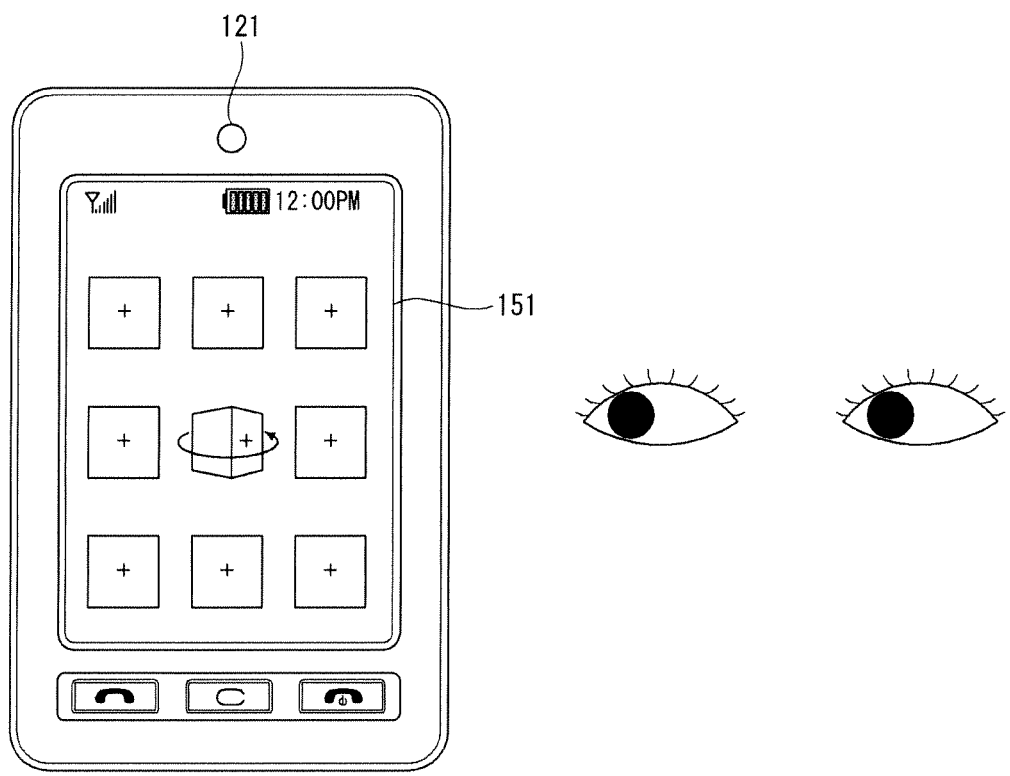
FIGS. 7 and 8 are diagrams showing an example of a method of selecting a three-dimensional menu icon in the method of controlling a three-dimensional user interface according to a third embodiment of the exemplary embodiment.
Figure 8:
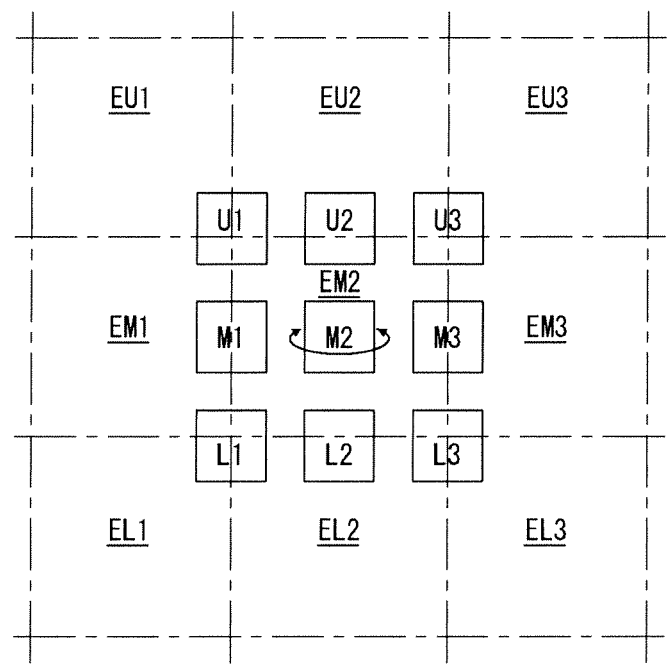

FIG. 6 is a flowchart showing a method of controlling a three-dimensional user interface according to a third embodiment of the exemplary embodiment. FIGS. 7 and 8 are diagrams showing an exemplary menu selection method of a step (S65) in the method of controlling a three-dimensional user interface according to a third embodiment of the exemplary embodiment.

Referring to FIG. 6, a plurality of three-dimensional menu icons is displayed on the display 151 of the mobile terminal 100 as three-dimensional graphic images (S61).

The camera 121 of the mobile terminal 100 photographs a user in front under the control of the controller 180 while the three-dimensional graphic images are displayed on the display 151 (S62).

The controller 180 monitors motions of the user who employs the mobile terminal 100 in real-time based on video signals, which are acquired by the camera 121, when the three-dimensional graphic images are displayed on the display 151 (S63). If it is determined that the user has moved, the controller 180 controls the 3D GUI image processing module to rotate the reference face of the respective three-dimensional menu icons every specific angle along the moving direction of the user (S64). The rotation speeds of the menu icons are adjusted according to the user's moving speed. As described above, the reference face is one lateral face of the three-dimensional menu icon, which is now displayed on the display 151 of the mobile terminal 100 before the user moves.

If the user selects any one of the three-dimensional menu icons displayed on the display 151 (S65), the controller 180 determines that the user has moved based on the images captured by the camera. If the user moves, the controller 180 can rotate only the selected three-dimensional menu icon along the moving direction of the user (S66 to S68). The selected three-dimensional menu icon may have face other than the reference face oriented toward the user in order to show down-level menus. Even in this case, the reference face of the selected three-dimensional menu icon follows the user's motion.

In FIG. 6, the steps S65 to S67 may be processed between the steps S61 and S62.

The menu selection method in the step S65 may be performed through the user input unit 130, such as a key pad, a dome switch, a touch pad (static pressure/capacitance), a jog wheel or a jog switch or may be selected based on a coordinate value of an image captured by the camera or a method observed by a user using other sensors, as shown in FIGS. 7 and 8.

The menu icon selection methods of FIGS. 7 and 8 are described below. In the case in which a plurality of three-dimensional menu icons is displayed on the display 151 in a 3×3 matrix form as shown in FIG. 8, two-dimensional coordinates of an image captured by the camera 121 are partitioned so that the two-dimensional coordinates are mapped to the menu icons one-to-one by taking a distance between a user and the mobile terminal into consideration. The partitioned coordinate values of the camera-captured image are stored in the memory 160. The controller 180 detects the user's eye position from the camera-captured image, compares a coordinate value of the eye position with the coordinate value stored in the memory 16, and determines a three-dimensional menu icon corresponding to the user's eye position as a menu icon selected by the user.

For example, in the case in which a user's eyes exists in an EM2 coordinate range in the camera-captured image as shown in FIGS. 7 and 8, the controller 180 determines a three-dimensional menu icon M2, which is located at the center of a central column, as a menu icon selected by the user. If a user's eye is located in an EU1 coordinate range in a camera-captured image, the controller 180 determines a three-dimensional menu icon U1, which is located on the left side of an upper column, as a menu icon selected by the user.

Figure 9:
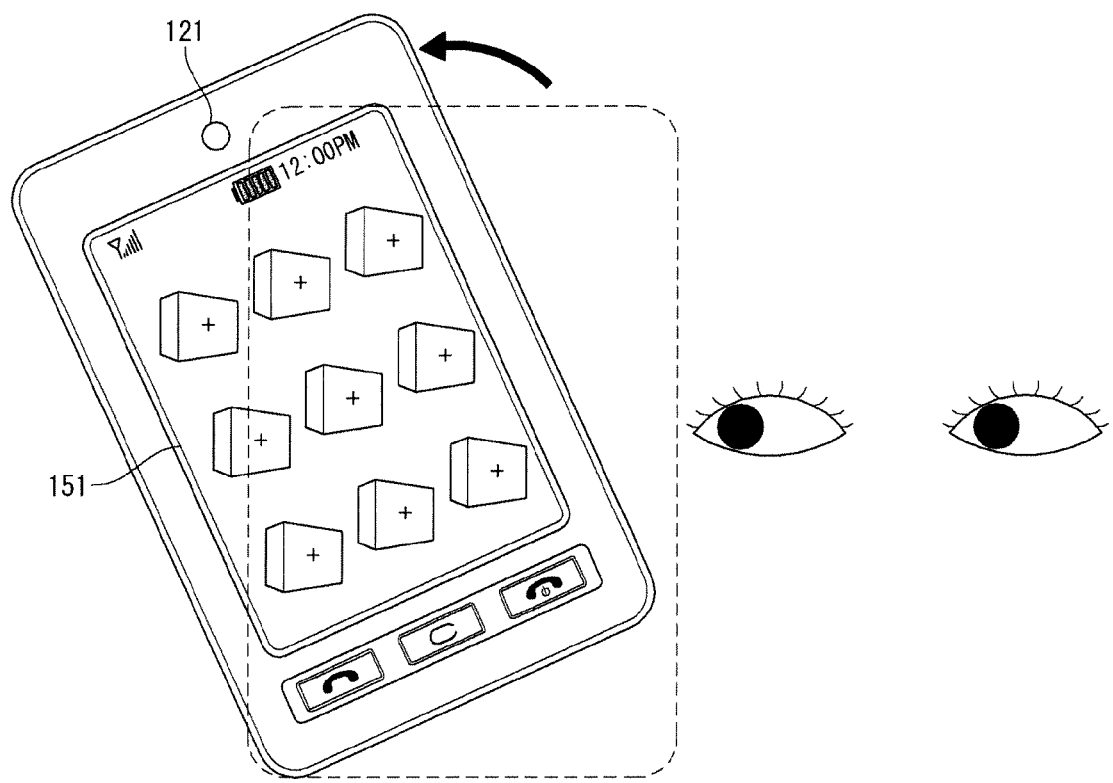
FIG. 9 is a flowchart showing a method of controlling a three-dimensional user interface according to a fourth embodiment of the exemplary embodiment.

FIG. 9 is a diagram showing an example of a method of controlling a three-dimensional user interface according to a fourth embodiment of the exemplary embodiment.

Referring to FIG. 9, in the method of controlling a three-dimensional user interface according to a fourth embodiment of the exemplary embodiment, a user's moving speed and moving direction is detected using sensor means such as a camera, and three-dimensional menu icons are rotated along the user's moving direction. The method of controlling a three-dimensional user interface according to a fourth embodiment of the exemplary embodiment adjusts the rotation direction of the three-dimensional menu icons by considering the slope of the mobile terminal 100.

An angle sensor built in the mobile terminal 100 senses an angle change when the mobile terminal 100 is inclined by a user's manipulation or other external force. The controller 180 determines the angle change received from the angle sensor and the user's moving speed and direction, and rotates the three-dimensional menu icons in an opposite direction to the inclined direction of the mobile terminal 100 and also rotates the three-dimensional menu icons along the moving direction of the user based on the determination.

The method of controlling a three-dimensional user interface according to a fourth embodiment of the exemplary embodiment may be combined with the above first to third embodiments. For example, in the method of controlling a three-dimensional user interface of the exemplary embodiment, when the three-dimensional user interface is displayed on the display 151 in each of the above embodiments, a user's motion and a slope of the mobile terminal can be monitored in real-time, and menu icons can be rotated by taking both the user's motion and the slope of the mobile terminal into consideration.

The method of controlling a three-dimensional user interface according to the embodiments of the exemplary embodiment may be recorded as a program for being executed in a computer in a computer-readable recording medium and then provided.

The method of controlling a three-dimensional user interface according to the embodiments of the exemplary embodiment may be executed through software. When the system and method is executed through software, constituent means of the exemplary embodiment are code segments that execute necessary tasks. The program or code segments may be stored in a processor-readable medium, or transmitted through a transmission medium or by a computer data signal coupled with carriers in a communication network.

Computer-readable recording media include all kinds of recording devices in which data capable of being read by a computer system is stored. For example, the computer-readable recording media may include ROM, RAM, CD-ROM, DVD-ROM, DVD-RAM, magnetic tapes, floppy disks, hard disks, optical data storages, and so on. The computer-readable recording media may also be stored and executed as codes, which are distributed into computer apparatuses connected over a network and readable by computers in a distributed manner.

As described above, in accordance with the method of controlling a three-dimensional user interface and a mobile terminal using the same according to the embodiments of the exemplary embodiment, a user's motion is monitored in real-time while three-dimensional menu icons are displayed on a mobile terminal. If the user moves, the three-dimensional menu icons are rotated so that the reference face of the three-dimensional menu icons follows the user's motion. Accordingly, the method of controlling a three-dimensional user interface and a mobile terminal using the same according to the embodiments of the exemplary embodiment can increase the degree of actual feeling of a three-dimensional user interface and implement a user-oriented user interface.

It will be apparent to those skilled in the art that various modifications and variations can be made in the exemplary embodiment without departing from the spirit or scope of the inventions. Thus, it is intended that the exemplary embodiment covers the modifications and variations of this invention provided they come within the scope of the appended claims and their equivalents.

What is claimed is:

1. A method of controlling a three-dimensional (3D) user interface of a mobile terminal, the method comprising:
    displaying a plurality of 3D menu icons on a screen, wherein the screen is divided into a plurality of areas and each of the plurality of 3D menu icons corresponds to one of the plurality of areas;
    sensing at least a user's movement or a location of at least one of the user's eyes via a camera;
    mapping the sensed location to one of the plurality of areas;
    selecting a 3D menu icon among the plurality of 3D menu icons, wherein the selected 3D menu icon corresponds to the mapped one of the plurality of areas; and
    rotating only the selected 3D menu icon in response to the sensed at least user's movement or location of the at least one of the user's eyes; and
    displaying a reference face of the selected 3D menu icon such that the displayed reference face is oriented towards the sensed location of the at least one of the user's eyes.

2. The method of claim 1, further comprising:
    determining a speed at which the at least one of the user's eyes moves from the sensed location; and
    rotating only the selected 3D icon according to the determined speed.

3. The method of claim 1, further comprising:
    determining an amount of the sensed user's movement;
    comparing the determined amount of the sensed user's movement to a threshold value; and
    rotating the selected 3D icon at a specific angle when the determined amount of the sensed user's movement is greater than the threshold value.

4. The method of claim 1, further comprising:
    determining a slope at which the mobile terminal is inclined; and rotating only the selected 3D icon in a direction that is opposite to the determined slope.

5. The method of claim 3, further comprising:
    rotating the selected 3D menu icon in a direction that is opposite to the specific angle.

6. The method of claim 1, wherein the displayed reference face of the selected 3D menu icon comprises a lateral face that is observable to the user before only the selected 3D menu icon is rotated.

7. A mobile terminal comprising:
    a display configured to display a plurality of three-dimensional (3D) menu icons each corresponding to one of a plurality of areas;
    a camera configured to sense at least a user's movement or a location of at least one of the user's eyes; and
    a controller configured to:
        map the sensed location to one of the plurality of areas;
        select a 3D menu icon among the plurality of the 3D menu icons, wherein the selected 3D menu icon corresponds to the mapped one of the plurality of areas;
        control the display to rotate only the selected 3D menu icon in response to the sensed at least user's movement or location of the at least one of the user's eyes; and
        control the display to display a reference face of the selected 3D menu icon such that the displayed reference face is oriented towards the sensed location of the at least one of the user's eyes.

8. The mobile terminal of claim 7, wherein the controller is further configured to:
    determine a speed at which the at least one of the user's eyes moves from the sensed location; and
    control the display to rotate only the display of the selected 3D menu icon according to the determined speed.

9. The mobile terminal of claim 7, wherein the controller is further configured to:
    determine an amount of movement of the at least one of the user's eyes from a first location to a second location;
    compare the determined amount of movement of the at least one of the user's eyes to a threshold value; and
    control the display to rotate only the selected 3D menu icon at a specific angle when the determined amount of movement of the at least one of the user's eyes is greater than the threshold value.

10. The mobile terminal of claim 9, further comprising:
    an angle sensor configured to sense an angle at which the mobile terminal is inclined, wherein the controller is further configured to control the display to rotate the selected 3D menu icon in a direction that is opposite to the specific angle.

11. The mobile terminal of claim 8, further comprising:
an input unit configured to receive a command to select the 3D menu icon among the plurality of 3D menu icons.

12. The mobile terminal of claim 9, further comprising:
an input unit configured to receive a command to select the 3D menu icon among the plurality of 3D menu icons.

13. The mobile terminal of claim 10, further comprising:
an input unit configured to receive a command to select the 3D menu icon among the plurality of 3D menu icons.

14. The mobile terminal of claim 7, wherein the displayed reference face of the selected 3D menu icon comprises a lateral face that is observable by the user before only the selected 3D menu icon is rotated.

\* \* \* \* \*